(12) United States Patent
Nishiyama

(10) Patent No.: US 6,449,083 B1
(45) Date of Patent: Sep. 10, 2002

(54) MULTI-CHANNEL OPTICAL MODULATOR

(75) Inventor: Toshimi Nishiyama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/647,597

(22) PCT Filed: Feb. 2, 2000

(86) PCT No.: PCT/JP00/00549
§ 371 (c)(1),
(2), (4) Date: Nov. 30, 2000

(87) PCT Pub. No.: WO00/46630
PCT Pub. Date: Aug. 10, 2000

(30) Foreign Application Priority Data

Feb. 4, 1999 (JP) ............................. 11-027586

(51) Int. Cl.[7] ................. G02F 1/11; G02F 1/33
(52) U.S. Cl. ........................ 359/285; 359/305
(58) Field of Search ................. 359/305, 285, 359/313; 347/255; 257/758

(56) References Cited

U.S. PATENT DOCUMENTS

| 4,000,493 A | * | 12/1976 | Spaulding et al. | ......... 347/255 |
|---|---|---|---|---|
| 4,555,160 A | * | 11/1985 | Gottlieb et al. | ............. 359/311 |
| 4,696,551 A | * | 9/1987 | Amano et al. | .............. 239/311 |
| 5,657,152 A | * | 8/1997 | Kadota | ........................ 359/305 |
| 5,929,893 A | * | 7/1999 | Son et al. | .................... 347/255 |
| 2001/0035585 A1 | * | 11/2001 | Ahn et al. | ................... 257/758 |

FOREIGN PATENT DOCUMENTS

| EP | 100238 | 2/1984 |
|---|---|---|
| JP | 1-131526 | 5/1989 |
| JP | 5-102297 | 4/1993 |
| JP | 5-116139 | 5/1993 |
| JP | 6-226972 | 8/1994 |

* cited by examiner

Primary Examiner—Ricky Mack
Assistant Examiner—Omar Hindi
(74) Attorney, Agent, or Firm—McDermott, Will & Emery

(57) ABSTRACT

The invention is intended to present a multi-channel optical modulator small in crosstalk, being used in a laser external modulator of an optical recording apparatus. To achieve the object, the multi-channel optical modulator comprises a plurality of first electrodes (13) provided on one side of an acoustic-optical medium (11), a plurality of piezoelectric elements (12) provided on the first electrodes (13), a plurality of second electrodes (14) provided on the piezoelectric elements (12), a plurality of first lead wires (15) connected individually to the second electrodes (14), and a plurality of second lead wires (16) connected individually to the first electrodes (13), and thereby the crosstalk is small.

10 Claims, 4 Drawing Sheets

MULTI-CHANNEL OPTICAL MODULATOR

TECHNICAL FIELD

The present invention relates to a multi-channel optical modulator used an external modulator for a laser recording apparatus such as laser printer and laser plotter.

BACKGROUND ART

A multi-channel optical modulator has a plurality of elastic wave generating sources, and the number of light beams corresponding to its number can be modulated simultaneously and independently, which allows to record at a higher speed by scanning at the same speed as when recording by a single light beam. Further, at the same recording speed, the recording density is higher than when using a single light beam. Therefore, the demand for multi-channel optical modulator is increasing along with the mounting requirement for recording at higher density and higher speed.

A conventional multi-channel optical modulator is described below.

As shown in FIG. 4 and FIG. 5, a first electrode 103 is formed on the entire surface of one side of an acoustic-optical medium 101, and a piezoelectric element 102 is disposed thereon. Five second electrodes 104 are provided on the piezoelectric element 102, and thereby five transducers are formed.

A first lead wire 105 is connected nearly to the center of each second electrode 104, and a second lead wire 106 corresponding to each first lead wire 105 is mutually connected to both ends of the first electrode 103. The first lead wire 105 and second lead wire 106 are connected to each driving signal source 107.

In thus constructed multi-channel optical modulator, the operation is described below.

First, the piezoelectric element 102 is oscillated by an alternating current signal supplied from the first lead wire 105 and second lead wire 106, and becomes an elastic wave generating source. Therefore, the acoustic-optical medium 101 has as many elastic wave generating sources as the number of transducers, that is, five. The generated elastic wave propagates vertically on the transducer mounted surface of the acoustic-optical medium 101, and acts on the light beam passing through the propagation area, thereby generating a diffracted light. This mode is shown in FIG. 7. Herein, "I" denotes an incident light, "I1" is a diffracted light, and "I0" represents a non-diffracted transmission light. Since the diffracted light intensity is proportional to the elastic wave intensity, that is, the driving signal strength, desired optical recording is realized by varying the driving signal strength depending on the recording pattern.

Components of this multi-channel optical modulator are expressed in a circuit diagram in FIG. 6.

Herein, the first lead wires 105 and second lead wires 106 are indicated by coil symbols because they have a very slight inductance. Reference numeral 108 indicates an output impedance of the driving signal source 107, and the driving signal sources 107 are commonly grounded by connecting among the transducers. The first electrode 103 is commonly shared among the transducers.

In this structure, when one transducer is driven, the voltage generated by the inductance of the second lead wire 106 may drive the output impedance 108 and the first electrode 103, or the piezoelectric element 102 of other transducer through the first electrode 103, thereby generating a crosstalk.

DISCLOSURE OF THE INVENTION

It is hence an object of the invention to present a multi-channel optical modulator small in crosstalk.

To achieve the object, the multi-channel optical modulator of the invention comprises an acoustic-optical medium, a plurality of first electrodes provided on one side of this acoustic-optical medium, a plurality of piezoelectric elements provided on the first electrodes, a plurality of second electrodes provided on the piezoelectric elements, a plurality of first lead wires connected individually to the second electrodes, and a plurality of second lead wires connected individually to the first electrodes, in which the first electrodes are independent of individual transducers, and therefore the voltage generated in the second lead wire of any transducer may not be applied to the piezoelectric element of any other transducer, so that a generation of crosstalk may be prevented.

DETAILED DESCRIPTION OF PREFERRED EMBODIMENTS

Figure 1:
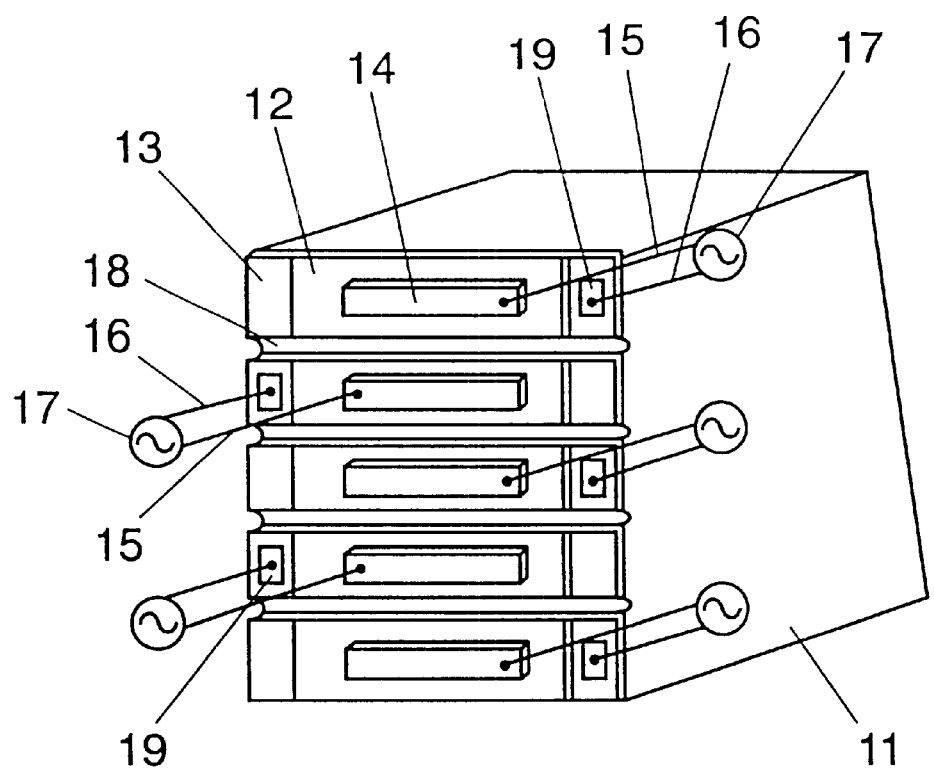
FIG. 1 is a perspective view of a multi-channel optical modulator in an embodiment of the invention.

An embodiment of the multi-channel optical modulator of the invention s described in detail below while referring to the accompanying drawings.

Embodiment 1

First, on the entire surface of one side of an acoustic-optical medium 11, Sn is deposited by vacuum deposition method such as sputtering method or resistance heating method, and first electrodes 13 are formed.

The acoustic-optical medium 11 is made of tellurium dioxide, lead molybdate, or a similar material allowing to pass light at the wavelength to be modulated, and having a large figure of merit in the acousto-optic effect. The acoustic-optical medium 11 has parallel upper and lower surfaces, and the first electrodes 13 are formed on the side vertical to these upper and lower surfaces. The side opposite to the side on which the first electrodes 13 formed is not parallel to the side on which the first electrodes 13 formed.

On the first electrodes 13, a piezoelectric element 12 having a narrower width than the width of the first electrodes 13 is formed.

The piezoelectric element 12 is made of lithium niobate which is a piezoelectric crystal, and it is compression-bonded onto the first electrodes 13 in a vacuum, and polished to a thickness for resonating at a driving frequency.

At this time, the piezoelectric element 12 is formed so that its width direction end may not coincide with the width direction end of the first electrodes 13, that is, it is deviated in position so that the second lead wires 16 may be formed on the first electrodes 13 in a later process.

On the piezoelectric element 12, further, five second electrodes 14 are formed at specific intervals. The second electrodes 14 have a three-layer structure, formed of Ni—Cr layer, Cu layer, and Au layer sequentially from the piezoelectric element 12 side.

Afterwards, four split grooves 18 are formed in the first electrodes 13 and acoustic-optical medium 11 by using a dicer between the adjacent second electrodes 14, and five transducers having independent piezoelectric elements 12 and first electrodes 13 are fabricated.

The first lead wire 15 is connected electrically by soldering to the second electrode 14 of each transducer. At this time, the first lead wire 15 is alternately connected to the different end from the adjacent second electrode 14. Further, the second lead wire 16 is soldered to the first electrode 13 at the soldering side of the first lead wire 15 of each transducer. At this time, for the ease of soldering of the second lead wires 16, a plating layer 19 of two layers made of lower layer of Cu and upper layer of Au is formed at the soldering position of the second lead wire 16 of the first electrode 13.

Consequently, in each transducer, the first lead wire 15 and second lead wire 16 are connected to a driving signal source 17.

Figure 2:
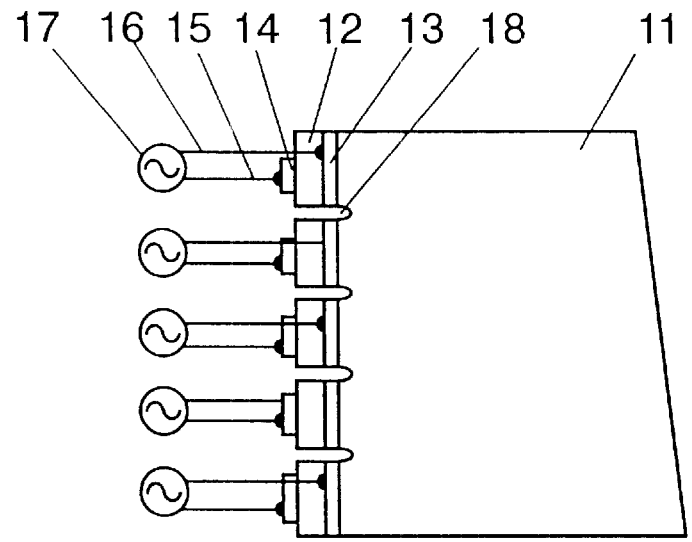
FIG. 2 is its side view.

Thus, the multi-channel optical modulator having five transducers of the same shape as shown in FIG. 1 and FIG. 2 is formed.

Figure 3:
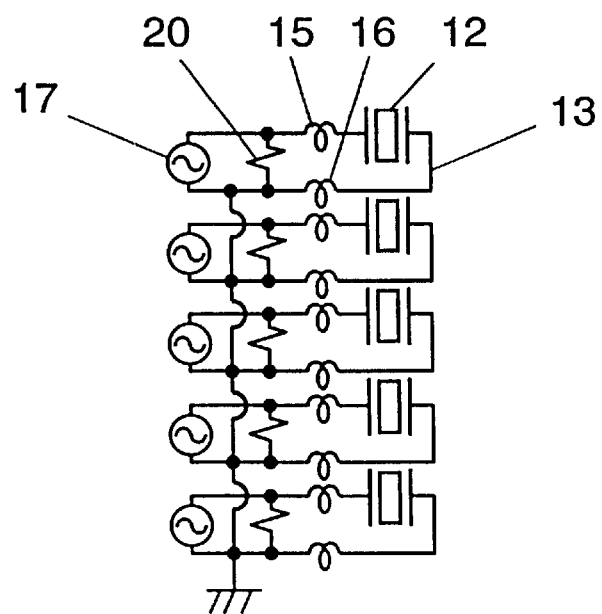
FIG. 3 is its circuit diagram.
Figure 4:
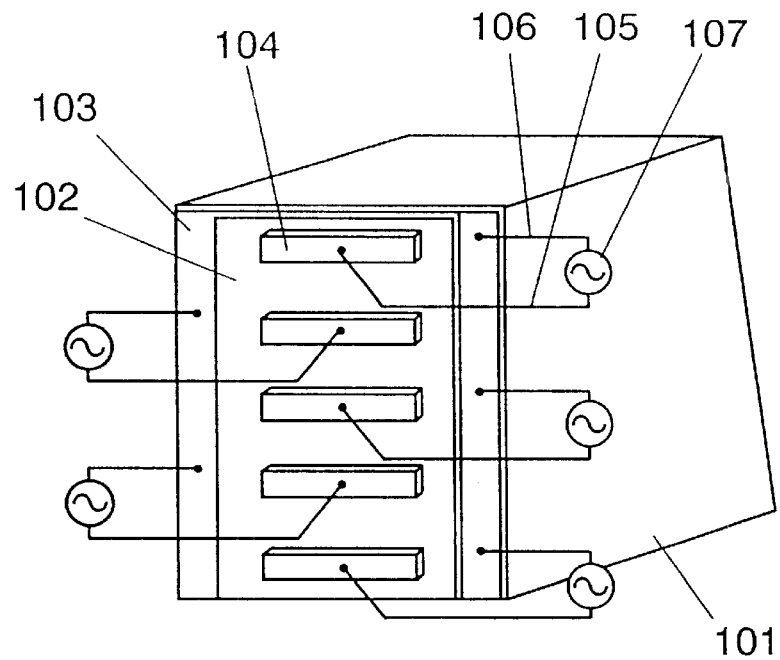
FIG. 4 is a perspective view of a conventional multi-channel optical modulator.
Figure 5:
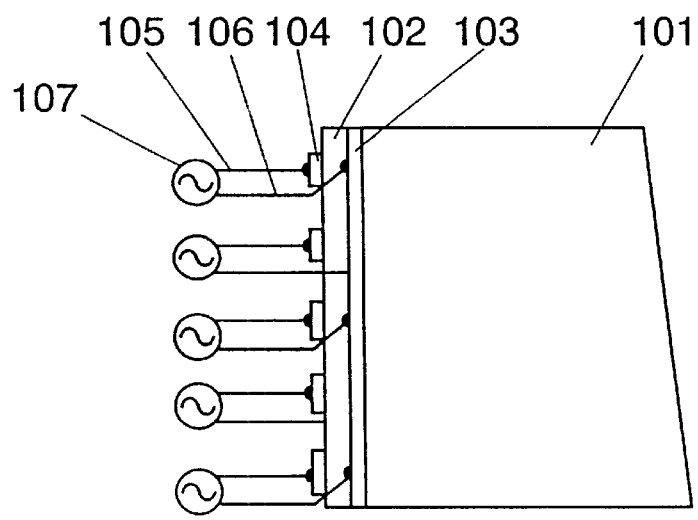
FIG. 5 is its side view.
Figure 6:
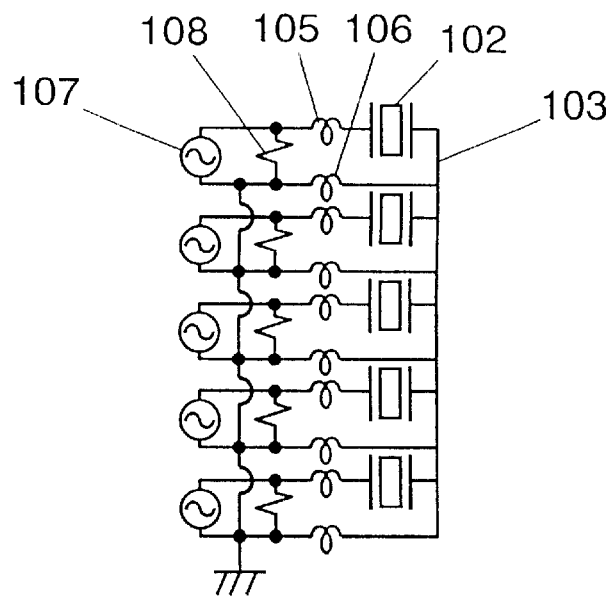
FIG. 6 is its circuit diagram.
Figure 7:
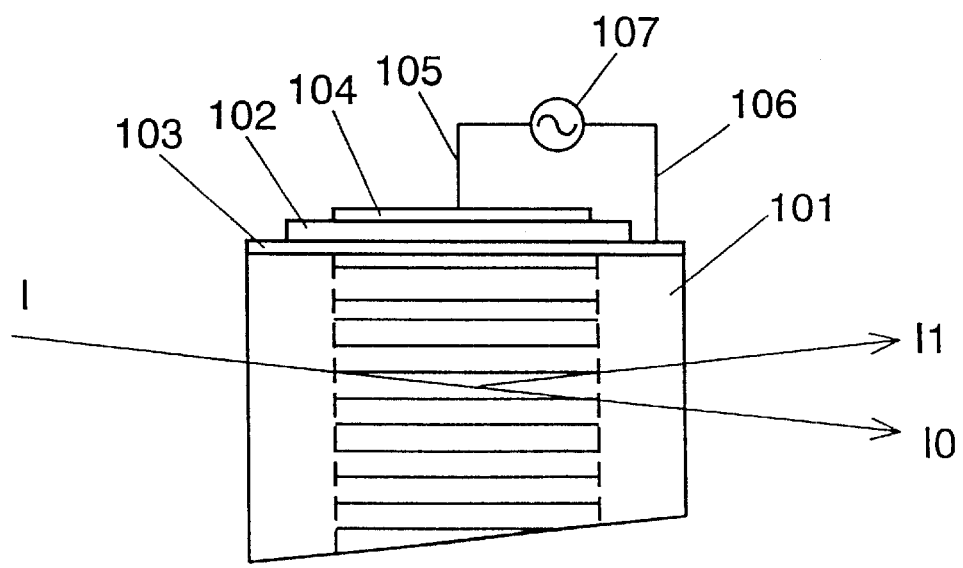
FIG. 7 is a diagram explaining the operation of a general one-channel optical modulator.

FIG. 3 is a circuit diagram of this multi-channel optical modulator, in which the first lead wires 15 and second lead wires 16 are indicated by coil symbol because they have, if very slight, an inductance. Reference numeral 20 is an output impedance of the driving signal source 17, and the grounding of the driving signal source 17 connected to each transducer is common.

Each transducer of this multi-channel optical modulator individually has an independent first electrode 13, and the signal of a certain transducer will not be applied to any other transducer through the output impedance 20 or first electrode 13.

Besides, since the distance between the first lead wires 15 of adjacent transducers is long, the induction of the inductance is small, so that the crosstalk may be decreased. The characteristic points of the invention are explained below.

(1) The transducer forming surface of the acoustic-optical medium 11 and its opposite side are preferred to be mirror-finished. surfaces in order to obtain a stable modulation operation.

(2) The first electrodes 13 are preferred to be formed by using Sn or In in order to obtain matching of acoustic impedance between the piezoelectric element 12 and acoustic-optical medium 11.

(3) The split groove 18 is formed so that its section may be in a U-form. It is because, if there is a sharp corner in the split groove 18, a stress is formed in the area to cause a crack in the acoustic-optical medium 11. Therefore, the surface forming the split groove 18 of the acoustic-optical medium 11 is formed in a curved surface.

(4) Usually, the light beam to be modulated enters in a range of 1 to 3 mm from the transducer. The elastic wave generated from the transducer is propagated radially, and the angle of radiation of the elastic wave is wider as the interval of the transducers becomes narrower.

Accordingly, when the transducer interval is narrow, the incident light is diffracted by the elastic wave generated by the adjacent transducer, thereby causing an crosstalk.

Therefore, by setting the depth of the split groove 18 deeper than the light beam incident position, if the transducer interval is narrow, it is possible to prevent crosstalk generated by the elastic wave transmitted from the adjacent transducers.

Incidentally, if free from effects of diffraction by the elastic wave from the adjacent transducer, the depth is not particularly defined as far as each transducer may exist independently electrically.

(5) The transducer generates heat by electro-mechanical conversion loss proportional to the electric input. Hence, deviation of temperature distribution depending on the holding structure and a shape of the acoustic-optical medium 11 may be generated in the acoustic-optical medium 11 to cause distortion.

On the other hand, the transducer is lowered in the modulation efficiency for a specific electric input if increased in the width in the vertical direction.

Therefore, in the case of the multi-channel optical modulator having a plurality of transducers, the transducer in the portion lower in the temperature of the acoustic-optical medium 11 is, as compared with the transducer in the portion higher in temperature, set larger in the width in the vertical direction, larger in the electric input for obtaining an equivalent efficiency, and more in the heat generation due to electro-mechanical conversion loss. Therefore distortion of the acoustic-optical medium 11 can be prevented without deviation of temperature distribution in the acoustic-optical medium 11 without varying the modulation efficiency of each transducer.

(6) In order to release heat in the acoustic-optical medium 11, it is preferred to form cooling plates on the upper and lower surfaces of the acoustic-optical medium 11. The shape of the cooling plate is not particularly specified as far as the surface contacting with the acoustic-optical medium 11 is flat.

(7) In this embodiment, by forming the split groove 18, a plurality of transducers having independent electrodes 13 are formed, but instead of forming the split groove 18, the first electrodes 13 and piezoelectric elements 12 may be preliminarily formed independently.

(8) The interval of the second electrodes 14 of the adjacent transducers should be as equal as possible. This is because if the interval of the second electrodes 14 is different, the crosstalk varies depending on the transducers.

(9) In the foregoing embodiment, five transducers are provided, but the number of transducers may be determined freely depending on the number of desired channels.

INDUSTRIAL APPLICABILITY

According to the invention, by forming the first electrodes of the transducers independently electrically, an excellent multi-channel optical modulator small in crosstalk is realized.

What is claimed is:

1. A multi-channel optical modulator comprising:

an acoustic-optical medium;

a plurality of first electrodes provided on one side of the acoustic-optical medium, each of said first electrodes having a first end and a second end;

a plurality of piezoelectric elements provided on the first electrodes;

a plurality of second electrodes provided on the piezoelectric elements, each of said second electrodes having a first end and a second end;

a plurality of first lead wires each of which is connected to one of the second electrodes; and a plurality of second lead wires each of which is connected to one of the first electrodes, wherein one of said first lead wires is connected to a given second electrode at either said first end or said second end of said given second electrode, and one of said first lead wires connected to another second electrode adjacent said given second electrode is coupled to the other one of said first end and said second end of said adjacent second electrode, and one of said second lead wires is connected to a given first electrode at either said first end or said second end of said given first electrode, and one of said second lead wires connected to another first electrode is coupled to the other one of said first end and said second end of said adjacent first electrode.

2. The multi-channel optical modulator of claim 1, wherein a split groove is provided in the acoustic-optical element between adjacent electrodes of the first electrodes.

3. The multi-channel optical modulator of claim 2, wherein the section of the split groove is a curved shape.

4. The multi-channel optical modulator of claim 2, wherein the depth of the split groove is deeper than a light beam incident position.

5. The multi-channel optical modulator of claim 1, wherein said first lead wire coupled to a given second electrode and said second lead wire coupled to a given first electrode are coupled to the same end of said first end and said second end of the respective electrode when said given second electrode and said given first electrode are coupled to the same one of said plurality of piezoelectric elements.

6. The multi-channel optical modulator of claim 1, wherein each of said plurality of piezoelectric elements has a length dimension which is less than the corresponding length dimension of a corresponding one of said first electrodes such that a top surface of each of said first electrodes is exposed at said first end and said second end.

7. A multi-channel optical modulator comprising:

an acoustic-optical medium;

a plurality of first electrodes provided on one side of the acoustic-optical medium, each of said first electrodes having a first end and a second end;

a plurality of piezoelectric elements provided on the first electrodes;

a plurality of second electrodes provided on the piezoelectric elements, each of said second electrodes having a first end and a second end;

a plurality of first lead wires each of which is connected to one of the second electrodes; and a plurality of second lead wires each of which is connected to one of the first electrodes, wherein each of said plurality of piezoelectric elements has a length dimension which is less than the corresponding length dimension of a corresponding one of said first electrodes such that a top surface of each of said first electrodes is exposed at said first end and said second end, each of said second lead wires being connected to said top surface of the corresponding first electrode at either said first end or said second end.

8. A multi-channel optical modulator comprising:

an acoustic-optical medium; and a plurality of transducers formed on a surface of said acoustic optical medium;

each transducer comprising:

a first electrode formed on said acoustic-optical medium, said first electrode having a first end and a second end;

a piezoelectric element formed on said first electrode; and a second electrode formed on said piezoelectric element, said second electrode having a first end and a second end;

wherein each transducer has a corresponding first lead wire and second lead wire, said first lead wire being coupled to said second electrode and said second lead wire being coupled to said first electrode, and said first lead wire and said second lead wire of a first transducer are coupled to the first end of the corresponding second electrode and first electrode, and said first lead wire and said second lead wire of a second transducer adjacent said first transducer are coupled to the second end of the corresponding second electrode and first electrode.

9. The multi-channel optical modulator of claim 8, wherein said piezoelectric element has a length dimension which is less than the corresponding length dimension of the first electrode such that a top surface of said first electrode is exposed at said first end and said second end.

10. The multi-channel optical modulator of claim 9, wherein said second lead wire is connected to said top surface of the corresponding first electrode at either said first end or said second end.

* * * * *